Figure 1:
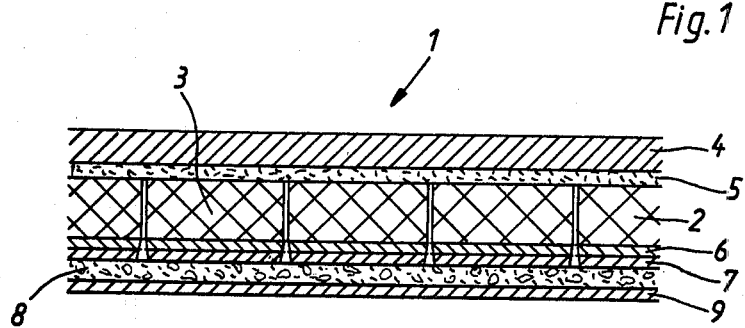

United States Patent [19]

Swarovski

[11] 4,328,276
[45] May 4, 1982

[54] GLASS MIRROR MAT CONSTRUCTION AND METHODS FOR FORMING AND USING THE SAME

[75] Inventor: Daniel Swarovski, Wattens, Austria

[73] Assignee: D. Swarvoski & Co., Glasschleiferei, Wattens, Austria

[21] Appl. No.: 120,596

[22] Filed: Feb. 11, 1980

Related U.S. Application Data

[63] Continuation of Ser. No. 804,318, Jun. 7, 1977, abandoned.

[30] Foreign Application Priority Data

Jun. 15, 1976 [DE] Fed. Rep. of Germany ....... 2626842

[51] Int. Cl.³ .......................... B32B 3/10; B32B 3/14; B32B 3/16; B32B 17/06
[52] U.S. Cl. ..................................... 428/213; 428/40; 428/54; 428/55; 428/56; 428/220; 428/332; 428/354; 428/432; 428/433; 428/434; 428/906
[58] Field of Search ................ 126/424, 438; 428/40, 428/54, 55, 56, 213, 220, 332, 354, 409, 432, 433, 434, 906

[56] References Cited

U.S. PATENT DOCUMENTS

| | | | |
|---|---|---|---|
| 1,214,863 | 2/1917 | Woeste | 428/49 |
| 1,382,261 | 6/1921 | Abeley | 156/155 |
| 2,383,884 | 8/1945 | Palmquist | 428/432 |
| 3,089,801 | 5/1963 | Tierney et al. | 428/906 |
| 3,152,950 | 10/1964 | Palmquist et al. | 428/335 |
| 3,173,826 | 3/1965 | Campbell et al. | 428/310 |
| 3,311,338 | 3/1967 | Culley | 428/40 |
| 3,681,179 | 8/1972 | Theissen | 428/338 |
| 3,716,432 | 2/1973 | Morrison | 428/41 |
| 3,753,841 | 8/1973 | Wheeler | 428/40 |
| 3,925,584 | 12/1975 | Suzuki et al. | 428/344 |
| 3,936,567 | 2/1976 | Vesely | 428/40 |
| 3,959,056 | 5/1976 | Caplan | 156/197 |
| 4,038,971 | 8/1977 | Bezborodko | 126/438 |
| 4,095,013 | 6/1978 | Burger | 428/335 |

FOREIGN PATENT DOCUMENTS 468803 7/1937 United Kingdom ................. 428/49

Primary Examiner—William J. Van Balen
Attorney, Agent, or Firm—Neuman, Williams, Anderson & Olson

[57] ABSTRACT

A layered glass mirror mat is provided which is particularly adapted for use in solar collectors. The glass mirror mat comprises glass strips having first sides adhered to a supporting film by means of an adhesive layer. The opposed strip surfaces have a reflective layer applied thereto and, if desired, overlying protective and/or gummed layers.

10 Claims, 2 Drawing Figures

U.S. Patent  May 4, 1982  4,328,276

GLASS MIRROR MAT CONSTRUCTION AND METHODS FOR FORMING AND USING THE SAME

This is a continuation of application Ser. No. 804,318, filed June 7, 1977, now abandoned.

This invention relates to a glass mirror mat construction and a method for its production. More particularly, this invention relates to a layered mirror mat construction particularly adapted for use in solar collectors.

Curved reflective surfaces are required for use in various applications, for example, in concentrating the sun's rays on a heat-conveying medium in solar collectors.

The prior art has previously employed reflective plastic films for such purposes. The disadvantages of these films are, however, numerous. Temperature and weather resistance, in particular, are not satisfactory resulting in early deterioration. Also, reflecting properties deteriorate significantly during the course of use. Thus experience demonstrated that reflective plastic films are unsuitable for use in concentrating solar collectors. Large integral reflective glass plates have also been employed. However, such plates particularly those of curved form, are difficult to transport and are subject to a high incidence of breakage.

In accordance with this invention a layered glass mirror mat is provided comprising separate mirrored strips having a gummed layer backing, and retained as a unit for handling purposes by means of an integrating film detachably engaging the nonmirrored faces of the strips. In the normal course of mat use the gummed layer surfaces of the strips are fitted in place on the curved support surface of a solar collector, and the integrating film stripped from the opposed strip faces. Thus the advantages of a large integral curved mirror are obtained without the usual attendant disadvantages.

It is an object of this invention to provide a glass mirror mat of reflecting glass strips to be used for defining curved reflective planes.

It is another object of this invention to provide a glass mirror mat of planar strips which is easy to produce and to transport, has good temperature and weather resistance, as well as high reflecting power.

It is a further object of this invention to provide a layered mat of mirrored glass strips which may be transported and stored in a planar or rolled condition whereby danger of breakage is substantially eliminated. By appropriate design of the glass strips, they may be applied to any type of curved surface.

It is another object of this invention to provide a method for the production of a glass mirror mat characterized by the steps of securing one side of a glass plate to a supporting film by means of an adhesive layer, and subsequently forming the glass plate into glass strips by means of scoring and breaking steps. A reflective layer is then applied to the exposed strip surfaces and, if desired, an overlying protective layer is applied to the strip reflective surfaces. A gummed layer, with or without a protective film, may then be applied to the reflective surfaces or the overlying protective layer.

It is an object of this invention to provide a glass mirror mat particularly adapted to concentrate the sun's rays in solar collectors.

The above and other objects of this invention will become apparent from the following description when read in the light of the accompanying drawings and appended claims.

In one embodiment of this invention a planar sheet of glass is adhesively secured to a flexible supporting or backing sheet such as a plastic film. The glass is then appropriately scored and fractured into discrete strips maintained as a unit by the backing sheet. A reflective layer is then applied to the exposed strip surfaces. If desired a protective coating such as a varnish may be applied over the glass strip reflective coating. A gummed layer may then be applied over the varnish layer if present or directly on the reflective surface if the varnish layer is absent. The gummed layer may be covered by a protective film until the time of use. Such glass mat may be conveyed in a planar or "rolled up" form in which the supporting sheet is wound upon itself with the glass strips in overlying layers.

As an alternative to the applying of the gummed layer to the glass strips, such layer may be applied to a substratum such as the curved surface of a solar collector and the glass strips fitted in place about such curved surface.

Figure 2:
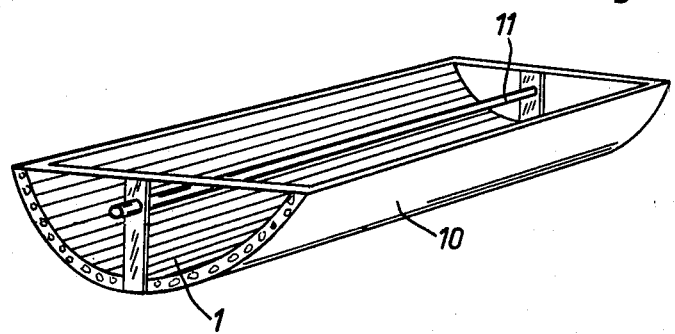

For a more complete understanding of this invention reference will now be made to the accompanying drawings, in which:

FIG. 1 is a fragmentary sectional view of one embodiment of a glass mirror mat made in accordance with this invention; and FIG. 2 is a perspective view of a solar collector lined with the glass mirror mat of FIG. 1.

Referring now to FIG. 1, a glass mirror mat 1 made in accordance with this invention is fragmentarily illustrated in section. Mat 1 comprises an initial integral glass plate 2 secured to a flexible supporting film 4 by means of an adhesive layer 5. The size of the initial glass plate may vary in dimensions to accommodate the use for which intended.

The minimum thickness of the glass plate 2 is normally dictated by the cost of production, since the production of very thin glass plates is difficult and therefore expensive. In principle, there is no maximum limit for the plate thickness. The use of thick glass plates, however, entails an increase in material and higher transportation weight and costs. The thickness of the glass plate preferably ranges between approximately 0.3 and 2 mm and, in particular, between about 0.5 and 1 mm. It is preferable to use weather-resistant glass in the formation of plate 2.

Supporting film 4 comprises a suitable flexible film material, particularly suitable is plastic material, for example polyethylene or polypropylene, or paper. The primary function of supporting film 4 is to provide the glass plate 2 with the necessary support for further processing, handling and use. It may be preferable to use a supporting film 4 made of paper, if adhesive layer 5 is applied at an elevated temperature.

Adhesive layer 5 may comprise any suitable material effecting desired adhesion between supporting film 4 and the glass plate. The adhesion between the supporting film 4 and the glass plate 2 should, however, be releasable. For manufacturing efficiency adhesive layer 5 preferably is applied as a self-adhesive layer to supporting film 4, so that the supporting film, desirably after detaching a protective covering (not illustrated) for the self-adhesive layer, can easily be secured with the glass plate.

Upon application of supporting film 4 to the initially integral glass plate 2, the plate is subdivided into strips by means of scoring and breaking steps. The scoring and glass-breaking steps are well-known in the glass art and need not be explained further. The glass plate 2 now subdivided into individual glass strips 3 defines a "glass mat" 2 as distinguished from the glass mirror "mat" comprising the assembly 1 of FIG. 1.

The manner of subdividing plate 2 into strips 3 is determined by the use intended for the resulting mat. If the glass mirror mat 1, for example, is to be used for lining parabolic-cylinder mirrors, the original plate may be cut into strips of a width of about 0.5 to 3 cm and preferably about 1 to 2 cm. Narrow strips are selected if the glass mirror mat is to be subjected to high curvature when mounted on a substratum. The length of the strips, as a matter of expediency, ranges between about 10 and 100 cm and preferably between about 20 and 50 cm.

The subdivision of the glass plate 2 may also be made into shapes different from the strip shape above mentioned. Segmentation into trapezoidal pieces, for example, is advantageous to line a circular solar collector. The term "glass strips" is therefore a general one in the context of this invention and is not restricted to rectangles. Subsequent to the formation of glass strips 3, a reflective layer 6 is applied to one surface thereof. The application of reflective layers to glass is well-known in the art. Suitable reflective layers comprise those formed from thin silver coatings in a known matter, or the coating by evaporation of aluminum in high vacuum. For purposes of this invention the glass strips 3 may employ a reflective metal film instead of the usual mirror-coating for purposes of forming layer 6. Reflective layer 6, if desired, may be protected by an overlying layer 7, which is usually a coating of protective varnish.

Subsequently, if required, a gummed layer 8 may be applied to protective layer 7 or, if no layer 7 is desired, directly to reflective layer 6. Gummed layer 8 serves to secure the glass mirror mat 1, depending on its use, with the object to be lined or covered. The choice of adhesive for the gummed layer is determined by the substratum to which the glass mirror mat is to be applied. Any known adhesive may be used. Gummed layer 8 may be self-adhesive or may be activated by heat or in any other manner.

Gummed layer 8 preferably comprises an elastic deformable adhesive. By using an elastic adhesive, the stress, for example, stress due to changes in temperature tending to remove the moderately adhering reflective layer 6 from the glass strips 3 is checked. This is of particular importance when employing a silver-type mirror layer, since adhesion of the silver coating to the glass is only slight. Examples of adhesives which may form layer 8 are acrylic resins, epoxy resins, silicone rubber and asphalt.

When using a self-adhesive material for gummed layer 8, usually a protective covering 9 such as a sheet of siliconized paper is provided which is removed before the glass mirror mat is placed on the substratum.

A film coated with adhesive on both sides may take the place of gummed layer 8. It may furthermore be advantageous to substitute for gummed layer 8 a padding material, for example a thin layer of foamed plastic or foamed rubber. Such substitute layer may be approximately 1 mm thick and is coated with adhesive on both sides. The padding also serves to avoid excessive stress being imparted to the glass mirror mat and, in particular, to the adhesion between the glass strips 3 and the reflective layer 6.

It is not necessary to employ gummed layer 8, a film with adhesive on both sides, or padding, in forming the glass mirror mat 1. As an alternative, the mat can also be stored and transported without a gummed layer 8 or its equivalent. When the glass mirror mat is ready for use, it, or preferably the substratum, is coated with a gummed layer, or a film with adhesive on both sides, or a padding with adhesive on both sides is applied to the substratum. The glass mirror mat is then applied and fitted in place on the adhesive medium on the substratum.

For the production of the glass mirror mat 1 according to the invention, modified processes can also be employed. Thus prefabricated glass strips, for example, can be arranged side-by-side with small intervals therebetween, preferably 0.1 to 0.5 mm. Subsequently the remaining steps are carried out, such as the application of the supporting film 4 with adhesive layer 5 and application of the reflective layer 6, with an overlying protective layer 7, if desired.

It is also possible to provide the individual glass strips 3 beforehand with a reflective layer 6 and, if desired, with a protective layer 7. The strips in turn are arranged appropriately with small intervals therebetween and are secured to the supporting film 4.

The glass mirror mats 1 according to the invention have a large variety of use possibilities. By connecting the individual glass strips 3 with supporting film 4, a flexible glass plate is obtained which may be transported in planar or rolled form without the risk of breakage or damage. As above noted the described glass mirror mats 1 are particularly suitable for use in concentrating solar collectors.

Concentrating solar collectors, which may be, for example, in the shape of parabolic-cylinder mirrors, are attaining increasing importance due to the energy shortage. Although the production of solar collectors of metallized plastic material is known, solar collectors of that type however, show poor reflection values. In addition, the reflecting power in the course of time decreases considerably due to environmental influences.

Furthermore, the lining of solar collectors with mirror-coated glass is known in the art. Although use of mirror-coated glass has resulted in good reflection values, a number of serious disadvantages must be tolerated with such use.

Production of parabolically curved glass plates, which are adapted to line trough-like solar collectors, is difficult and therefore expensive. The parabolic curvature of the glass plates must be effected by means of thermic deformation. The mirror-coating of curved-glass troughs or tubs is complicated, cannot be carried out continuously and thus entails additional high production costs. The trough-like glass collectors due to their given shape cannot be stacked, are difficult to transport and break very easily.

The above disadvantages can be substantially completely eliminated in employing glass mirror mats above described for lining solar collectors.

The glass mirror mats may be transported in a plane arrangement or in a rolled state without difficulty and without the risk of breakage. The production costs are extremely economical, since mirror-coating on the planar mat may be carried out continuously. The glass mirror mat may be assembled at the site in trough-like solar collectors, and this can be done without thermic deformation due to their pliability. The fact that the glass mirror mat is connected with the collector trough by means of adhesive ensures that no hollow spaces, in which corrosion may occur, form between the mat-substratum surfaces. Compared with plastic films, glass mirror mats have a superior reflecting power, superior weather resistance, superior resistance to scratching and the reduced reflection caused thereby as well as superior cleaning properties.

A concentrating solar collector lined with a glass mirror mat according to the invention is illustrated in FIG. 2.

Solar collector trough 10, for example, may be formed of plastic material (polyester resins, reinforced with glass fibers if required, polyurethane and the like), weather-resistant asbestos cement, concrete, metal or other suitable materials. The trough may be ribbed and have longitudinal reinforcements to increase its strength. Suitable fastening means may form a part of the trough. The design of trough-like solar collectors which may, for example have a size of 1.8 m² and their use is known. Thus, FIG. 2 merely schematically shows an absorber tube 11 through which a heat transfer fluid may flow.

Solar collector trough 10 can easily be lined with the surface-conformable glass mirror mat 1 according to the invention. The segmentation, i.e., in particular the width of the strips 3, is selected so as to enable the glass mirror mat to be curved according to the curvature of the supporting substratum. In case of a shallow curvature, wide glass strips 3 may be used. The glass mirror mat 1 is placed into the solar collector trough after removal of optional protective film 9 attached to the gummed layer, and is secured to the trough by means of layer 8 or its equivalent. As above stated, if the glass mirror mat is not provided with a gummed layer itself, a gummed layer is applied to the solar collector trough. The glass mirror mat is then fitted in place on the supporting surface of the solar collector trough.

The use of an elastic deformable adhesive is preferable in layer 8 since it improves on the one hand the resistance to impact, and on the other hand, forms an elastic padding which is capable of absorbing stress resulting from the varying coefficients of expansion of the materials. Suitable adhesives are, for example, silicone rubber, asphalt or epoxy resins. It is also desirable to provide a padding of thin foamed plastic or foamed rubber for the same reasons as were stated for using elastic adhesive.

When using a number of glass mirror mats to line large solar collectors, the individual mats may be jointed by means of silicone rubber or other suitable materials.

As above mentioned, the use of glass mirror mats is not restricted to use in the formation of parabolic-cylinder mirrors. Circular parabolic mirrors, for example, may also be lined with glass mirror mats. In this case a different glass strip form, preferably trapezoidal in shape, may be employed.

It is believed that the foregoing description has suggested many modifications of the glass mirror mat construction and method of forming the same which modifications remain within the ambit of the invention disclosed. Accordingly, this invention is to be limited only by the scope of the appended claims.

What is claimed is:

1. A glass mirror mat comprising a plurality of glass strips having opposite surfaces; a supporting film for said strips; each of said strips having one surface releasably adhesively secured to said film; each of said strips having a surface opposite to said one surface and comprising a reflective layer for substantially completely reflecting light striking the same.

2. The glass mirror mat of claim 1 in which a protective covering is applied over said reflective surface of each strip.

3. The glass mirror mat of claim 1 in which a gummed layer is disposed over each reflective surface of each strip.

4. The glass mirror mat of claim 3 in which a releasable covering is disposed over said gummed layer.

5. The glass mirror mat of claim 2 in which a gummed layer is disposed on said protective covering.

6. The glass mirror mat of claim 1 in which each of said glass strips has a thickness of about 0.3 to 2 mm and a width of about 0.5 to 3 cm and a length of about 10 to 100 cm.

7. The glass mirror mat of claim 3 in which said gummed layer comprises an elastic, deformable adhesive.

8. The glass mirror mat of claim 3 in which said gummed layer comprises a thin layer of foamed plastic or foamed rubber coated with adhesive on both sides.

9. The glass mirror mat of claim 1 in which said glass strips are arranged in edge-to-edge relation on said film; disposition of said mat on a curved concave supporting surface formed with a radius of curvature with said supporting film disposed uppermost resulting in a substantially continuous reflecting surface with the surfaces of said strips being substantially uniformly disposed relative to said radius of curvature about which said reflecting surface is formed.

10. The glass mirror mat of claim 1 in which said mat and film are so flexible as to enable said mat to be rolled upon itself without strip breakage.

* * * * *